United States Patent
Hallak et al.

(10) Patent No.: US 9,141,290 B2
(45) Date of Patent: Sep. 22, 2015

(54) SNAPSHOT MECHANISM

(75) Inventors: Renen Hallak, Tel-Aviv (IL); Kirill Shoikhet, RaAana (IL); Irit Yadin-Lempel, Caesarea (IL); Erez Webman, Petach-Tikva (IL); Shahar Frank, Ramat-HaSharon (IL)

(73) Assignee: EMC Corporation, Hopkinton, MA (US)

( * ) Notice: Subject to any disclaimer, the term of this patent is extended or adjusted under 35 U.S.C. 154(b) by 205 days.

(21) Appl. No.: 13/470,317

(22) Filed: May 13, 2012

(65) Prior Publication Data

US 2013/0305002 A1     Nov. 14, 2013

(51) Int. Cl.
G06F 12/00     (2006.01)
G06F 3/06      (2006.01)

(52) U.S. Cl.
CPC .............. *G06F 3/061* (2013.01); *G06F 3/065* (2013.01); *G06F 3/067* (2013.01); *G06F 3/0665* (2013.01)

(58) Field of Classification Search
CPC ........... G06F 11/1456; G06F 11/2074; G06F 11/2071; G06F 11/1451; G06F 11/2082; G06F 3/0608
USPC ........................................................ 711/162
See application file for complete search history.

(56) References Cited

U.S. PATENT DOCUMENTS

| | | | | |
|---|---|---|---|---|
| 7,257,689 B1* | 8/2007 | Baird | ............................ | 711/162 |
| 7,987,156 B1* | 7/2011 | Chatterjee et al. | ............ | 707/638 |
| 8,423,733 B1* | 4/2013 | Ozdemir | ........................ | 711/162 |
| 2006/0218364 A1* | 9/2006 | Kitamura | ...................... | 711/162 |
| 2007/0112714 A1* | 5/2007 | Fairweather | .................... | 706/46 |
| 2010/0042802 A1* | 2/2010 | Helman et al. | ................ | 711/173 |

* cited by examiner

*Primary Examiner* — Charles Rones
*Assistant Examiner* — Nanci Wong
(74) *Attorney, Agent, or Firm* — Krishnendu Gupta; Konrad R. Lee

(57) ABSTRACT

A memory management system for a thinly provisioned memory volume in which a relatively larger virtual address range of virtual address blocks is mapped to a relatively smaller physical memory comprising physical memory blocks via a mapping table containing entries only for addresses of the physical memory blocks containing data. The memory management system comprises a snapshot provision unit to take a given snapshot of the memory volume at a given time, the snapshot comprising a mapping table and memory values of the volume, the mapping table and memory values comprising entries only for addresses of the physical memory containing data. The snapshot is managed on the same thin provisioning basis as the volume itself, and the system is particularly suitable for RAM type memory disks.

28 Claims, 15 Drawing Sheets
(7 of 15 Drawing Sheet(s) Filed in Color)

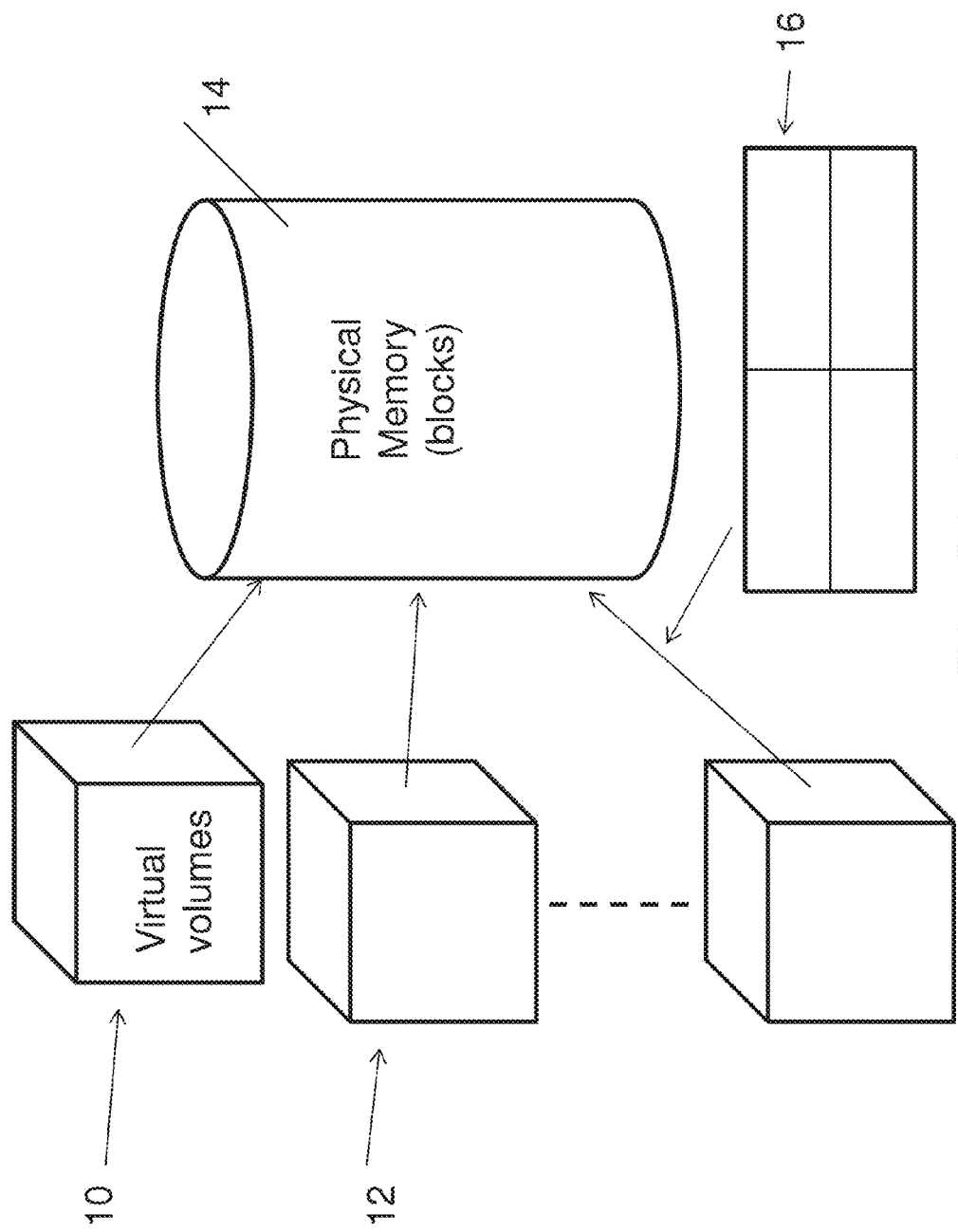

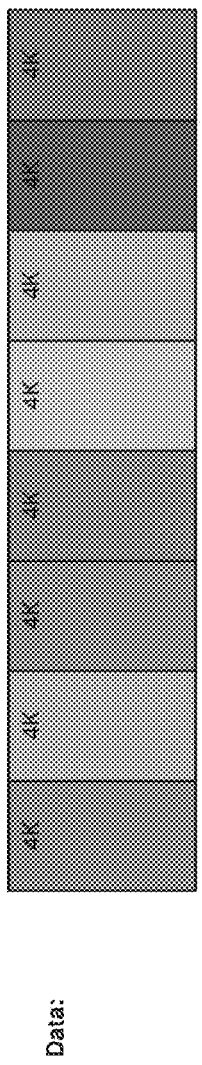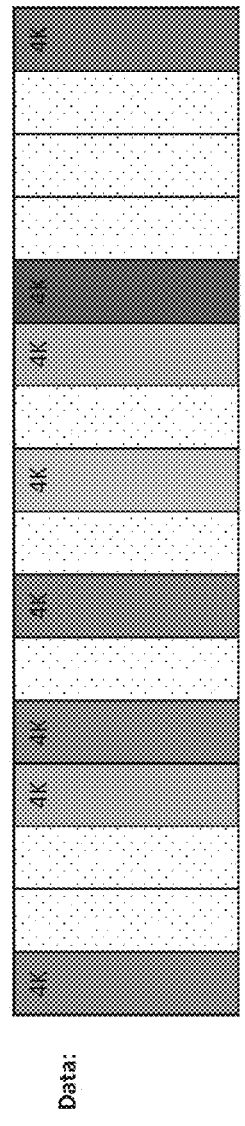
FIG. 2A Prior Art
FIG. 2B Prior Art

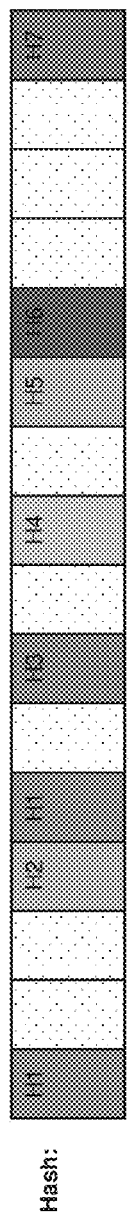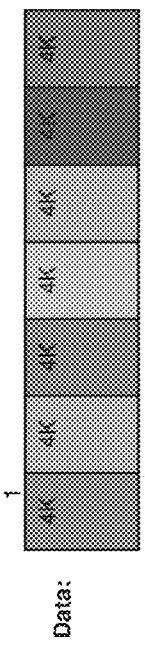
FIG. 3
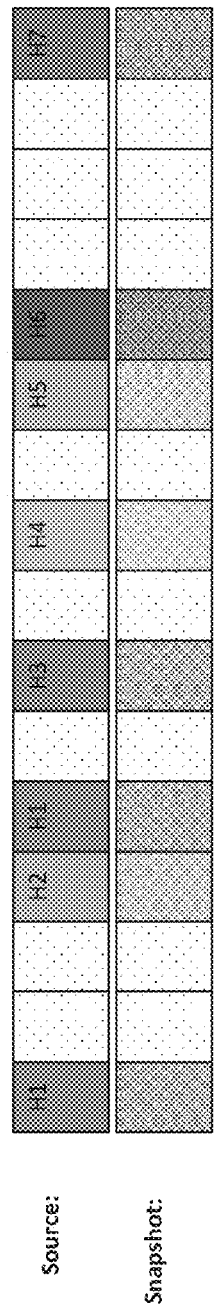
FIG. 4

SNAPSHOT MECHANISM

FIELD AND BACKGROUND OF THE INVENTION

The present invention, in some embodiments thereof, relates to a snapshot mechanism for computer memory and, more particularly, but not exclusively, to a snapshot mechanism that provides an image of all or part of a computer memory frozen at a given time.

Computer memory organization is typically split into physical organization—physical disks and memory cards etc on the one hand and logical—volumes or logical partitions on the other hand. Snapshots provide instantaneous copies of the volume.

Snapshots, or zero time copies, are used for various purposes. These uses include taking copies for backups across different points in time, as well as using multiple copies of a database for different uses, for example production, Development, Testing, different copies for different users, copies for users of virtual machines, disaster recovery etc. Writable snapshots, sometimes known as clones, are used in virtualization infrastructure as multiple images of virtual machines. Snapshots may also be used as the internal mechanism to implement asynchronous replication between storage arrays.

Snapshot implementations are varied, and can be roughly categorized according to the following parameters:
   Read-Only vs. Writable
   Data Space Efficiency
   Metadata Space Efficiency
   Hierarchies & Restrictions
   Performance The following briefly considers each of the above-listed parameters and various implementations thereof.

Read-only snapshots are typically used for purposes such as backup. They cannot be written to and thus do not change. Hence there is thus no point in taking snapshots of read-only snapshots. Writable snapshots however, can be read from and written to just like ordinary volumes, and in some cases it makes sense to take a snapshot of a writable snapshot. Aside from backups, writable snapshots are the usual choice.

From the point of data efficiency, two types of solutions exist. The first is not data space efficient, which means that the snapshot uses up space according to the address space of the volume it was taken from, regardless of the number of writes performed to it or to its ancestor volume. The second is data space efficient, which means that only subsequent writes to the snapshot or its ancestor volume may take up space. However, if the granularity is for example 1 MByte, each subsequent write to a new 1 MByte address range will use up space equal to at least 1 MByte, even if only 4 KByte were actually written. Thus, data space efficient snapshot can be further divided into rough granularity and fine granularity variants.

Regarding metadata space efficiency, where metadata is to be interpreted as auxiliary structures (e.g. mapping tables) used by the snapshot mechanism, the question is again how much metadata is needed per snapshot. It is specifically important to be metadata space efficient when discussing short lived snapshots, since relatively few writes are made to these snapshots and to their ancestor volume during their lifetime. Thus, the metadata may often take more space than the data itself. This is also true in thinly provisioned memory systems and in systems which employ a data deduplication mechanism. Metadata space efficiency has several possible levels. Most systems consume metadata in accordance with the address size of the original volume. Thinly provisioned systems may consume metadata in accordance with the amount of data previously written to the original volume, which is still quite wasteful because both the original volume and the snapshot share this data until pieces of it are changed in one of them.

The next parameter is hierarchies and restriction. This refers to various restrictions such as the number of snapshots, the times in which they can be taken or removed, and the volumes/snapshots they can be taken from. The most restrictive form allows each volume to have a single snapshot taken at any given point in time. More lenient forms allow several snapshots (up to some limit) to be taken on the same volume only after various time intervals have elapsed from the last snapshot taken. Even more lenient forms allow snapshots to be taken on writable snapshots. Most systems have limits on the number of snapshots and the amount of space snapshots may take up.

The last parameter is performance. It can be further divided to read/write performance and to create/delete performance. Read performance usually depends on the number of reads from disk needed to retrieve a piece of data. Write performance depends on the number of operations which must be performed per user write. Popular approaches include "copy on write" which requires two writes and one read per user write and "redirect on write" which requires only one write. Again, "redirect on write" depends on the granularity of the mechanism. For example, if the granularity of the mapping table is 1 MByte, meaning each megabyte has a single pointer to a physical data location, a 4K user write will still require extra writes and reads to be performed in order to copy the megabyte of data encompassing the 4K block to the newly chosen location.

Creation and deletion of snapshots can also be performed at various efficiency levels. Creation of snapshots must be instant, but may contain prolonged asynchronous procedures which depend on the address space of the original volume or on the amount of data previously written to the original volume. Snapshot deletion is usually a factor of the data and metadata efficiencies, since all data and metadata must be deleted. In most cases, this requires going over metadata in accordance with the address space of the snapshot, or even the aggregated address space of all snapshots of this ancestor volume. Often, a prolonged snapshot deletion process delays the creation of new snapshots, due to a limit on the number of snapshots or a limit on the amount of space available. This delay may significantly increase the RPO (Recovery Point Objective) when using snapshots to implement asynchronous replication Traditionally, memory is stored and accessed by assigning addresses to fixed size (e.g. 512 B or 4 KB) chunks of data, as shown in FIG. 1. Each such address is in fact a number in some range, and the range indicates the amount of available memory to be written and read.

Thin Provisioning

Reference is now made to FIG. 2, which illustrates an enhancement of the above traditional storage known as thin provisioning. Under thinly provisioned systems, the range of addresses can be much larger than the actual amount of available memory. In this case, the address to data mapping array can be viewed as a sparse array, where many addresses do not have a value. In this case the mapping can be viewed as being from logical user address to internal physical location.

Data Deduplication

Reference is now made to FIG. 3 which is a simplified diagram showing an enhancement, of the thin provisioning of FIG. 2 to provide data deduplication. In some cases, identical chunks of data may appear under different addresses. To avoid holding two or more duplicate copies of the same data chunk (deduplication), another layer of indirection may be introduced. Instead of mapping multiple addresses to the same chunk of data, one can map addresses to much shorter hash digests of typically a few bytes, representing the 4K data chunks, and further map these hash digests to the internal physical location according to the actual data they represent.

Snapshots

Reference is now made to FIG. 4 which illustrates thin provisioning as per FIG. 3 but with a snapshot made of the thinly provisioned memory source.

It is noted that the snapshot of FIG. 4, is in fact a duplication of the original address range, whether the original address range is fully provisioned or only thinly provisioned. A snapshot is taken of a specific address range at a certain point in time, and inherits all the mappings of that address range. Furthermore, it may overwrite mappings and diverge from the source range (or volume) it was taken from.

SUMMARY OF THE INVENTION

The present embodiments relate in one aspect to a snapshot of a thinly provisioned volume or other logical data construct, which snapshot comprises metadata relating to changed parts of the address range only in relation to an ancestor, and is thus in itself only thinly provisioned. The snapshot may be part of a hierarchy of snapshots wherein the metadata for a given location may be placed at the point in which it first appears in the hierarchy and which metadata is pointed to by later snapshots.

According to an aspect of some embodiments of the present invention there is provided a memory management system for a memory volume, the system comprising a snapshot provision unit configured to take a given snapshot of the memory volume at a given time, the snapshot comprising a mapping table and memory values of the volume, the mapping table and memory values comprising entries for addresses of the physical memory containing data, which values entered differ from an ancestor of the snapshot.

In an embodiment, the volume is a thinly provisioned memory volume in which a relatively larger virtual address range of virtual address blocks is mapped to a relatively smaller physical memory comprising physical memory blocks via a mapping table containing entries only for addresses of the physical memory blocks containing data.

In an embodiment, the given snapshot is part of a hierarchy of snapshots taken at succeeding times, and wherein the snapshot provision unit is configured to provide the entries to the given snapshot for addresses of the physical memory to which data was entered subsequent to taking of a most recent previous snapshot in the hierarchy, and to provide to the given snapshot pointers to previous snapshots in the hierarchy for data entered prior to taking of a most recent previous snapshot.

In an embodiment, the snapshot provision unit is configured to create a read-only version of the thinly provisioned memory volume to provide a fixed base for the hierarchy.

In an embodiment, the snapshot provision unit is configured to provide a first tree structure of the hierarchy to indicate for each written memory block a most recent ancestor snapshot of a queried snapshot containing a respective entry.

In an embodiment, the snapshot provision unit comprises a read function which traverses the first tree structure to read a value of a given block, and a write function which writes a block value to a most recent snapshot in the hierarchy.

In an embodiment, the snapshot provision function is configured to provide a second tree structure, the second tree structure indicating, for each written memory block, which level of the hierarchy contains a value for the block.

In an embodiment, the snapshot provision unit comprises a read function configured to traverse the second memory structure to find a level of the hierarchy containing a value for a requested block and then to use the first memory structure to determine whether the level containing the value is an ancestor in the hierarchy of a level from which the block was requested.

In an embodiment, the snapshot provision unit further comprises a delete function for deleting snapshots, wherein for a snapshot to be deleted which has a single sibling, values of sibling and parent nodes are merged into a single node.

In an embodiment, the physical memory comprises random access memory disks.

In an embodiment, the blocks are of a granularity of one member of the group consisting of less than 100k, less than 10k and 4k.

In an embodiment, the snapshot provision unit is configured to align mapping data of a respective snapshot to a page of memory.

In an embodiment, the snapshot provision unit is configured to provide a third tree structure, the third tree structure returning a Depth-First Search ordering of respective snapshots of the hierarchy, such that leaves of each snapshot are ordered consecutively and that if a snapshot A is an ancestor of a snapshot B then the ordering of leaves of A completely overlaps that of B.

In an embodiment, the snapshot provisioning unit is configured with a read function, the read function configured to use the third tree structure to obtain a list of snapshots having a value at a requested memory address, and to find a closest ancestor in the list of a requesting snapshot by traversing the snapshots of the list and returning a respective snapshot of the list which is an ancestor of the requesting snapshot and has a minimum number of leaves.

In an embodiment, the snapshot provision unit is configured to provide an indirection layer or a look-aside table to provide data deduplication.

According to a second aspect of the present invention there is provided a memory management method comprising taking a given snapshot of a memory volume at a given time, providing the snapshot with a mapping table and memory values of the volume, the mapping table and memory values comprising entries for addresses of the physical memory containing data, and wherein the values differ from data in an ancestor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 illustrates a physical memory being made available to a system as a much larger virtual memory via a mapping table according to the known art;

FIG. 2A is a simplified block diagram illustrating full provisioning of a memory segment according to the known art;

FIG. 2B is a simplified block diagram illustrating thin provisioning of a memory segment according to the known art;

FIG. 3 is a simplified block diagram illustrating data deduplication under thin provisioning;

FIG. 4 is a simplified block diagram illustrating a snapshot of a thinly provisioned memory segment;

FIG. 5 is a simplified block diagram illustrating thin provisioning memory management with thin provisioning snapshots, according to an embodiment of the present invention;

FIG. 6A is a simplified diagram illustrating a snapshot tree according to embodiments of the present invention;

FIG. 6B is a simplified diagram illustrating a memory table for the snapshot tree of FIG. 6A;

FIG. 7 is a simplified block diagram of a modification of a hierarchy tree according to the present embodiments, which implicitly create an anonymous internal read-only snapshot identical to the source, and have two or more user volumes/snapshots inherit therefrom;

FIG. 8 is a simplified block diagram of a snapshot tree;

FIG. 9 is a simplified block diagram of an address tree;

Figure 10:
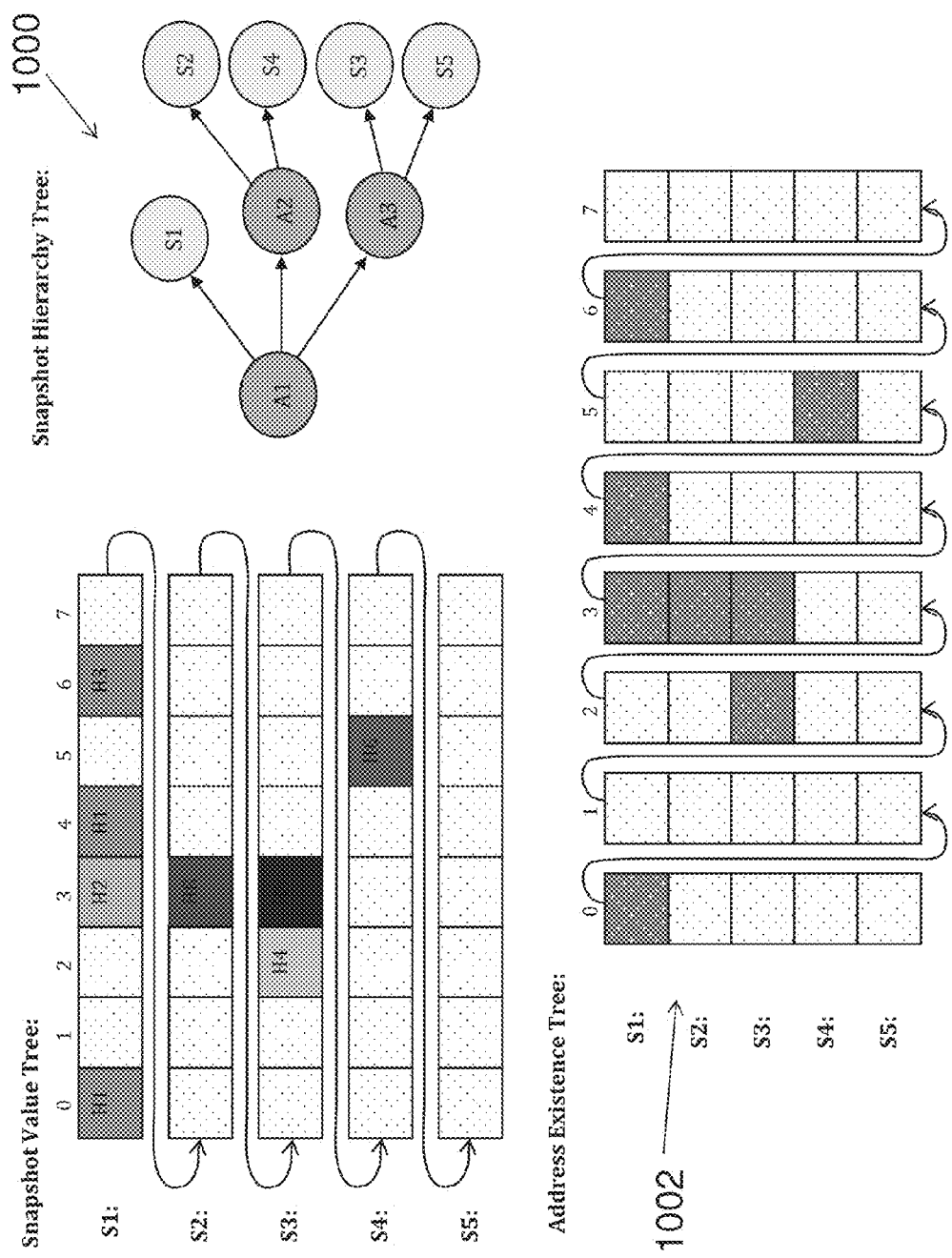
Figure 11:
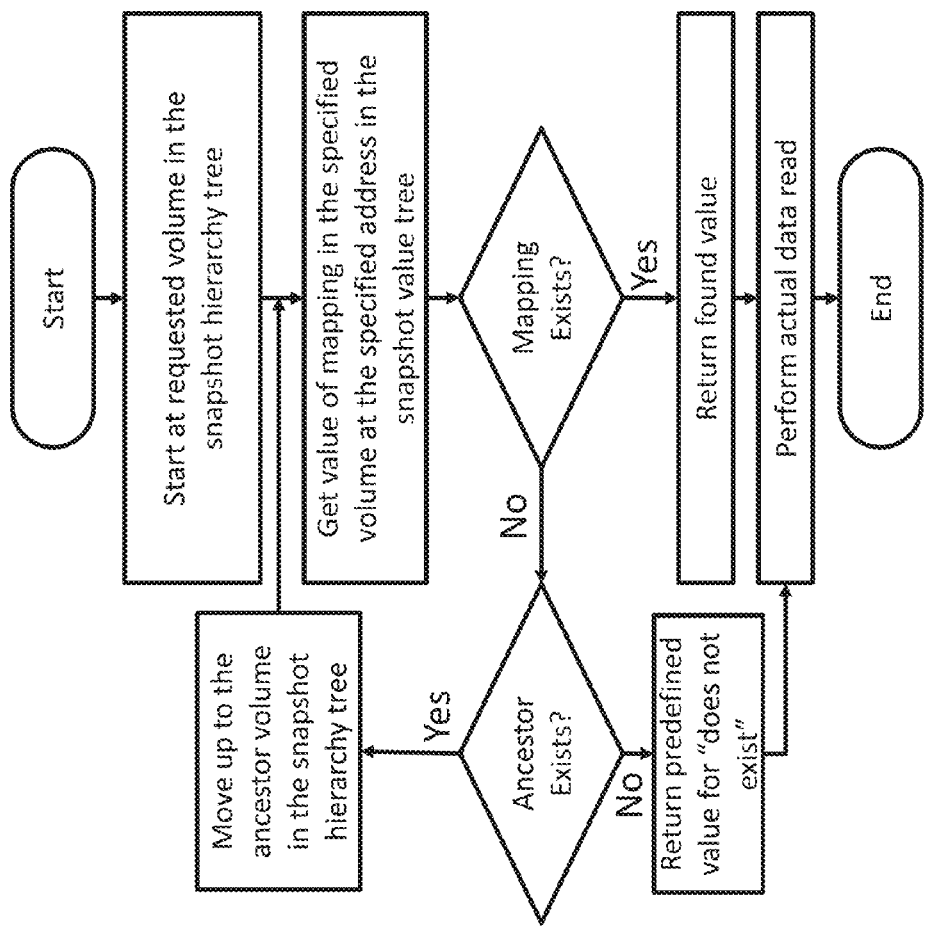
Figure 12:
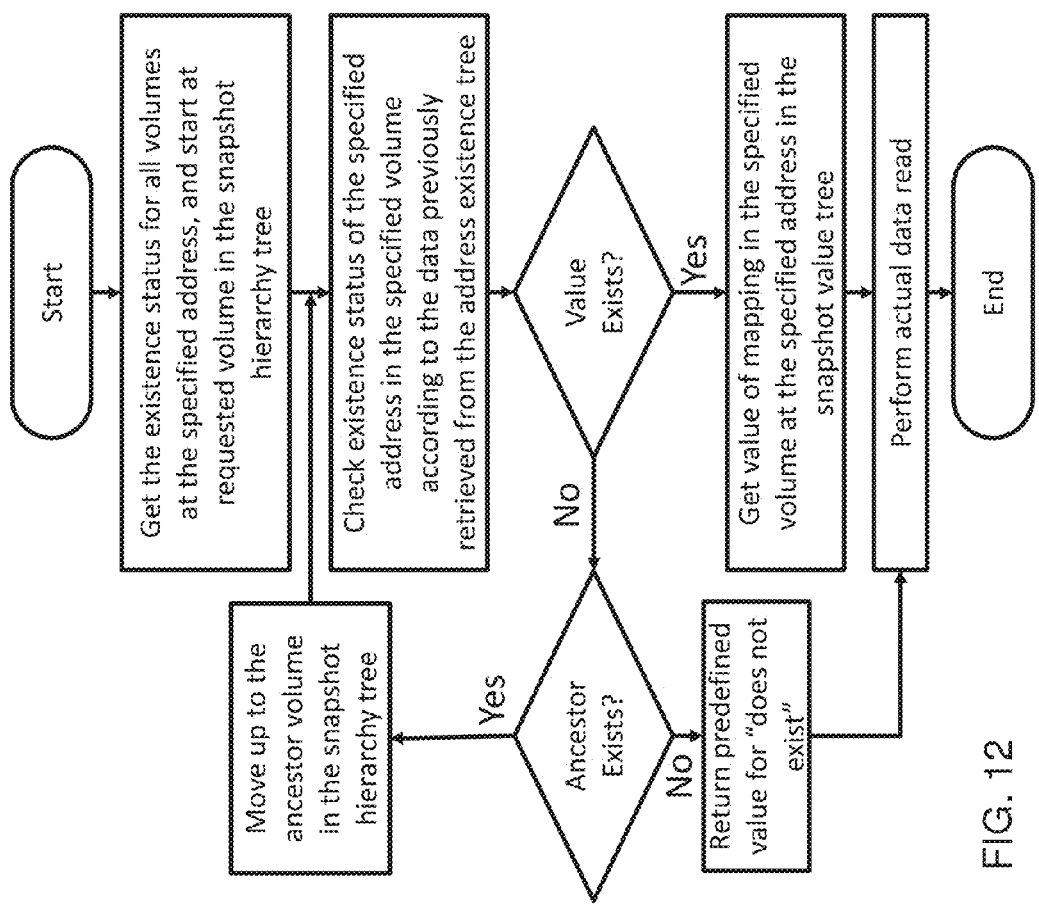
Figure 13:
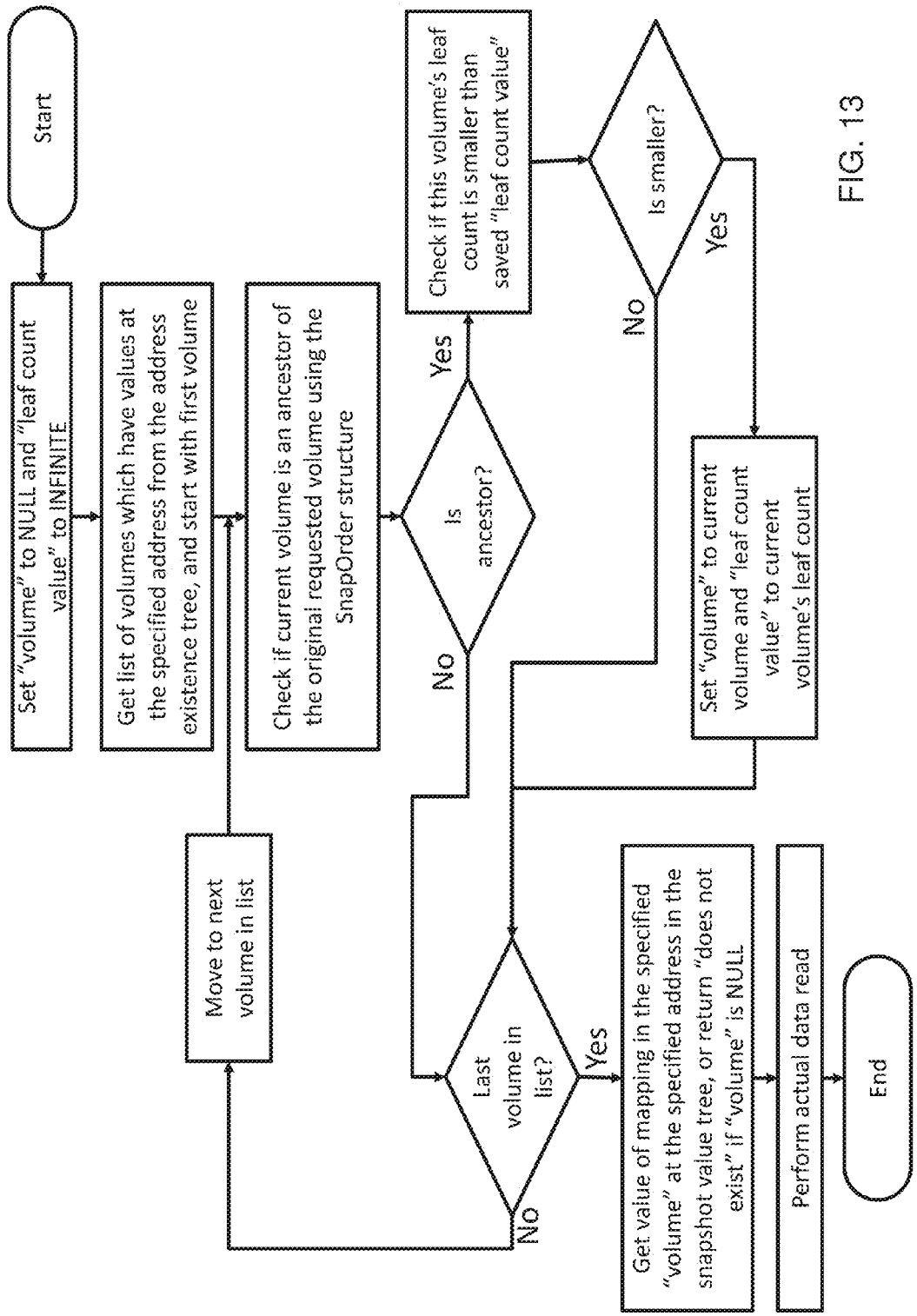
Figure 14:
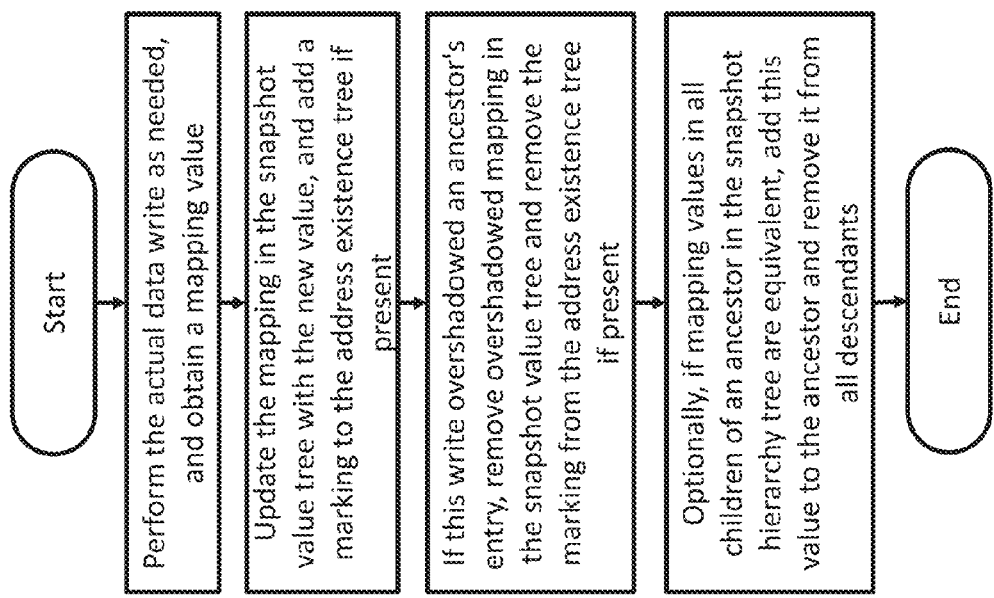
Figure 15:
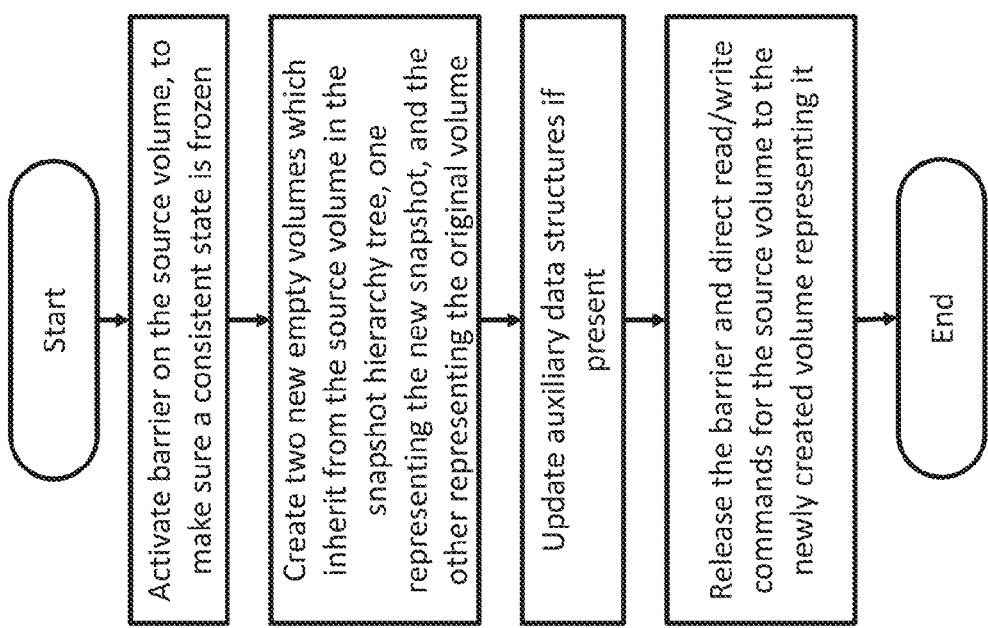
Figure 16:
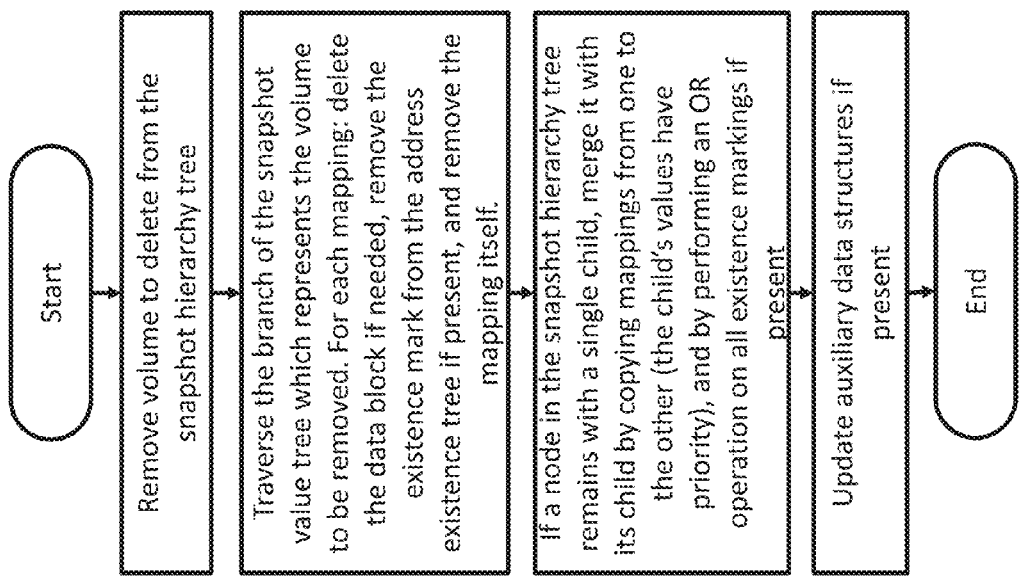

FIG. 10 is a simplified schematic diagram illustrating a hierarchy tree, a value tree and an address existence tree according to an embodiment of the present invention;

FIG. 11 is a simplified flow chart illustrating a procedure for reading a snapshot according to embodiments of the present invention;

FIG. 12 is a simplified flow chart illustrating a first enhancement of the read procedure of FIG. 11, using an existence tree;

FIG. 13 is a simplified flow chart illustrating a further enhancement of the read procedure of FIG. 11, using a snap order structure;

FIG. 14 is a simplified flow chart illustrating a procedure for writing to a snapshot according to embodiments of the present invention FIG. 15 is a simplified flow chart illustrating a procedure for creating a snapshot according to embodiments of the present invention;

FIG. 16 is a simplified flow chart illustrating a procedure for deleting a snapshot according to embodiments of the present invention.

DESCRIPTION OF SPECIFIC EMBODIMENTS OF THE INVENTION

The present invention, in some embodiments thereof, relates to a method for managing volumes in general and particularly snapshots in a storage array. In the present embodiments, there are very few limitations with regards to snapshots, and in fact snapshots and volumes are implemented using nearly identical constructs. In terms of internal implementation, a snapshot according to the present embodiments is a sparse array of the volume address range but including only those parts of the volume which have changed.

All snapshots may be writable, and can all have snapshots of their own. Each volume/snapshot can have a number of snapshots limited only by the total number of volumes in the array, and they can be nested to any possible depth. Snapshots may be removed regardless of their location in the snapshot tree, and regardless of whether a parent or siblings or children exist at the time of removal.

It is desirable that snapshots are taken very fast, in principle a zero time copy, since data does not change during the taking of the snapshot. The present embodiments help to approach this ideal since time is not spent traversing the virtual address range or parts of the address range when creating a snapshot. Additionally, snapshot creation under the present embodiments does not require an asynchronous process in order to complete. Other functions such as snapshot delete operations are also considerably faster.

The present embodiments allow for a hierarchical arrangement including snapshots on snapshots.

Snapshot schemes according to the present embodiments may be optimal in terms of data and metadata space efficiencies. They may use a granular mapping, which means that user writes do not generally take more data space than their size. Moreover, when set in the setting of a CAS based array, data space efficiency may be further increased due to deduplication. Metadata is kept to be within an order of magnitude of the amount of blocks written by the user to different logical addresses plus a negligible constant amount of metadata per volume/snapshot. This is regardless of the address space that is defined for the volumes and of the number of snapshots taken.

The present schemes may be contrasted with typical implementations which can take metadata space which is the full address space of the volumes multiplied by the number of volumes/snapshots.

With regard to write performance, each user write may cause exactly one write to disk. This is true for volumes which do not have snapshots, for volumes which do have snapshots, and for the snapshots themselves. Creation and deletion performance is also optimal. Snapshots may be taken and removed very frequently, as the creation process takes constant time, and the deletion process depends only on user writes performed during the lifespan of the snapshot, whether the user write is to the snapshot or its ancestor volume. Hence short lived snapshots will contain a small amount of changes and will thus be deleted very quickly.

The snapshot mechanisms is based on the implementation of a granular mapping between logical user addresses and internal addresses, made possible in part due to the random access nature of the underlying media. The internal address may constitute a physical address on disk where this data resides, or the encompassing storage array may contain further indirections. For example, the internal address may in fact be a key based on the contents of the block in question, such as a hash digest, which is used to decipher the physical location of the block in a CAS based storage array.

The mapping is in one view a thin provisioning volume construct, which may be used for both root volumes and snapshots or for snapshots only, and which takes metadata space in proportion to the amount of data written by the user. The construct may receive a logical user address and return an internal address if available or an empty indication otherwise.

The present embodiments may thus keep metadata only according to the amount of data written, that is to say, metadata is a function of the amount of data written to different logical addresses rather than of the address space. Small granularity—say around 4k, may be considered.

In an embodiment, the deletion of snapshots may take time in a way that is proportional to the number of user writes performed to different logical addresses on the snapshot itself and on the original volume during the lifespan of the snapshot. Note that a maximum of one write per address may be counted. Thus, if a write is performed to both the original volume and the snapshot, it should not be counted twice but rather may count as a single write.

Hereinbelow, a mechanism is described for mapping from Address to Hash—or alternatively mapping for Logical user address to internal physical location, or any other index. The present embodiments may see that the amount of metadata memory is bounded by the actual mappings, as opposed to the address range.

It may be apparent that, once snapshots are introduced, thin provisioning of these snapshots takes on a different significance. With thin provisioning it is possible to read from addresses that were never written to by the user, and thus should not contain a mapping or have any metadata overhead. The user may expect to receive meaningful data because these mappings may be inherited. When creating a snapshot, the address range is effectively doubled, a multitude of ghost mappings may be created, and yet, using the present embodiments, the metadata overhead may remain unchanged.

Figure 6A:
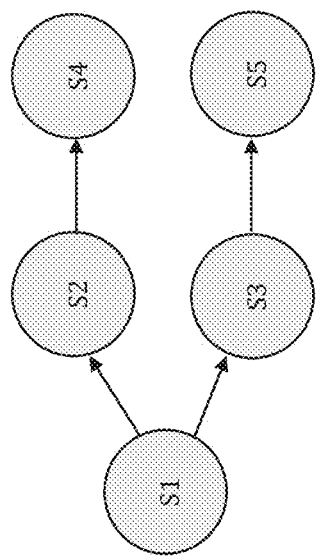
Figure 6B:
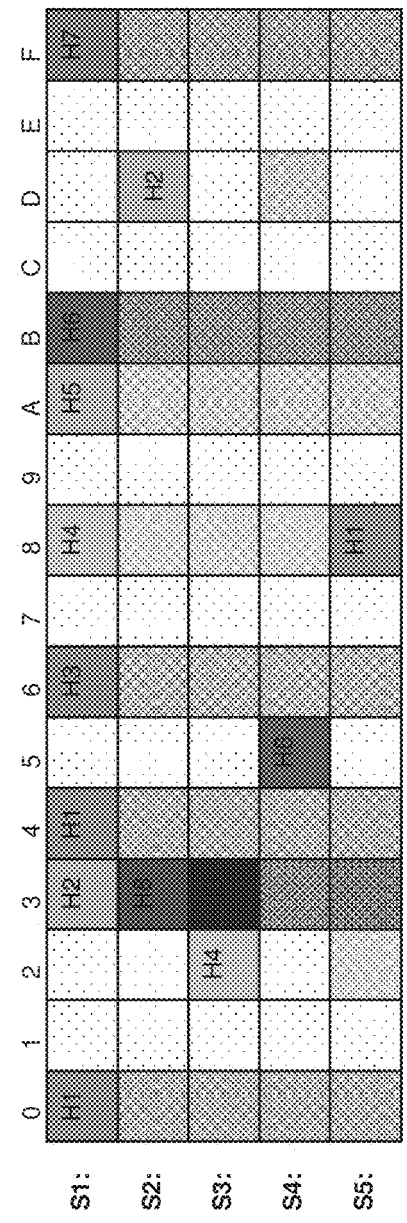

In embodiments, many snapshots may be created at various points in time. Snapshots may be taken from the original source address range as well as from previously created snapshots acting as new sources. FIGS. 6A and 6B show an example of a snapshot tree, and its appropriate mappings table respectively. According to the restriction discussed hereinabove, only numbered cells, which represent user writes, may have mapping metadata associated with them. The values of ghost mappings, or for that matter lack of mappings, present in the rest of the cells may be deduced from the metadata held for the user writes, with aid from the snapshot tree. It is noted that since FIGS. 6A and 6B lack a third dimension to represent time, in the example we simplistically assume that once a snapshot is taken, its source becomes read-only. Thus, complexities present in the real world, in which user writes and snapshot creation are often interleaved, are not faithfully depicted in this simplistic example.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 5:
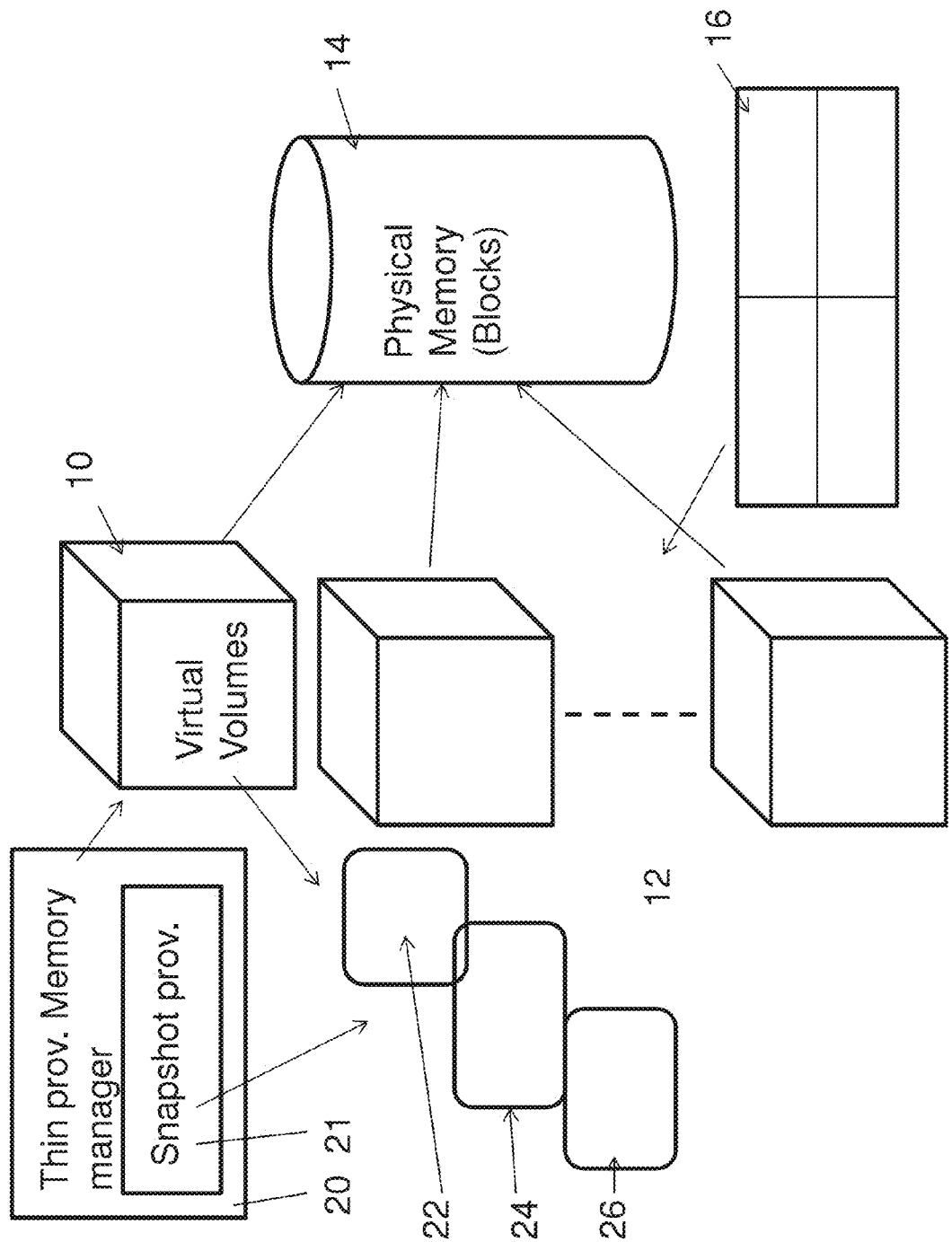

Referring now to the drawings, FIG. 1 illustrates a known memory management system for a thinly provisioned memory volume in which a relatively larger virtual address range for the virtual address volumes 10, 12 . . . is mapped to a relatively smaller physical memory 14 comprising physical memory blocks. Using thin provisioning, the mapping is via a mapping table 16 containing entries only for addresses of the physical memory blocks containing data. FIG. 5 shows an enhancement of the memory management system of FIG. 1 in which thin provisioning memory management 20 further includes a snapshot provisioning unit 21 which defines snapshots on the same thin provisioning basis as the memory volumes. The snapshot provisioning unit 21 may take a given snapshot of the memory volume at a given time, and provide a mapping table and memory values of the volume, which comprise entries only for addresses of the physical memory containing data and only for entries which have changed with respect to an ancestor.

FIG. 5 shows three snapshots 22, 24 and 26, of virtual volume 10. The snapshots are taken at succeeding times, so that each snapshot is part of a hierarchy of snapshots. Just as the thin provisioning in general marks only those blocks which have been changed, so with snapshots taken at succeeding times, each snapshot in the hierarchy need only hold a value which has changed since its preceding snapshot. For all other values it need simply hold a pointer to its immediate ancestor in the hierarchy. That is to say the snapshot provision unit 21 provides entries to any given snapshot only for addresses of the physical memory to which data was entered subsequent to taking of a most recent ancestor snapshot in the hierarchy. For all other values the snapshot simply contains a pointer to its ancestor.

The snapshot provision unit 21 may create an internal read-only version of the memory volume to provide a fixed base for the hierarchy. Thus the hierarchy may contain its own full tree of values and will not be invalidated if data is changed in the volume.

The snapshot provision unit 21 may provide tree structures to efficiently navigate the hierarchy, particularly for read operations. A first tree structure may be constructed to indicate a most recent ancestor snapshot of a queried snapshot containing an entry for a particular memory block.

The read function may traverse the first tree structure to eventually reach an ancestor snapshot which contains a value of the given block.

A write function on the other hand, may write a block value to a snapshot in the hierarchy which is a leaf in the tree without affecting ancestor volumes up the tree.

A second, derivative, tree structure may indicate, for each written memory block, which level of the hierarchy contains a value for the block.

In the case of this second tree structure, the read function may find a level in the hierarchy containing a value for a requested block. However then it would still have to determine whether the level containing the value is in fact an ancestor.

A third tree structure, also a derivative, may be constructed to provide a Depth-First Search ordering of respective snapshots of the hierarchy. Properties of such a structure include leaves of each snapshot being ordered consecutively. Furthermore, if a snapshot A is an ancestor of a snapshot B then the range of leaves of A completely overlaps that of B.

A read function for the third tree structure may use the third tree structure to obtain a list of snapshots having a value at a requested memory address, then find a closest ancestor of a requesting snapshot by traversing the snapshots to find the snapshot which is an ancestor of the requesting snapshot and has a minimum number of leaves.

The snapshot provision unit 21 may include a delete function for deleting snapshots. If the snapshot to be deleted is has a single sibling in the hierarchy tree, then values of the two nodes representing its father and sibling can be merged into a single node following its deletion. Priority would be given to the later values, that is the values of the child node, and such a function is useful in systems that use large numbers of short lived snapshots, to prevent what would otherwise be a very rapid formation of a very large tree hierarchy when at any time only a subset of the nodes are of any interest.

The present system is particularly applicable in cases where the physical memory comprises random access memory disks such as flash disks, which have no bias towards sequential memory readout. This system may be implemented on standard magnetic hard drives by incurring some performance degradation or increasing its granularity.

A particular design consideration in thin provisioning is the block size or granularity with which the physical memory is addressed. Larger block sizes tend to lead to smaller mapping tables but the individual memory access operations are much larger. The present embodiments use fine granularity, less than 100k, more typically less than 10k, and most typically 4k, which is the data write size preferred by many modern applications.

The snapshot provision unit 21 may align mapping data of a respective snapshot to a page of memory, to minimize data retrieve operations. Preferably, access of a single snapshot should be achieved with a single retrieval operation.

An initial challenge in providing a snapshot facility is to give an optimal upper bound on memory consumption for mapping metadata. The bound may define using memory in the order of the amount of user generated mappings (user writes) plus (not times) the number of snapshots.

Furthermore, a solution may retain time efficiency in the process of reducing the memory footprint. The creation of snapshots is preferably performed in negligible constant time. Deletion of snapshots likewise may be performed in time proportional to the number of user addresses written to on the snapshot being deleted, as opposed to the number of addresses written across all snapshots. Writing a new value to a certain address as well as reading a value may also be done in reasonable time, by accessing a minimum number of CPU cache lines.

On top of the space and time considerations, preferred embodiments may scale up, and therefore are provided as demotable. By "demotable" is meant that in case not all of the metadata has room in memory (RAM), some of the metadata may be demoted to disk. In order for demotion to be practical, the embodiment may provide that, at most, one block of metadata actually read from a disk is needed per user operation. Since user operations may frequently include reads to several consecutive addresses, the present embodiments may handle these cases with a maximum of one block of metadata read from disk.

The present embodiments may allow a very large number of snapshots, and a wide range of addresses. The present embodiments are, in so far as possible, agnostic to snapshot creation patterns as well as read/write patterns. All snapshots may be writeable unless specifically defined to remain read-only.

Solution Alternatives

It may be apparent that there are two main data structures to work with—the snapshot hierarchy tree and the sparse A->H (or logical user address to internal physical location) table. In the following, the volume/snapshot/range identifier concatenated with the block offset/address inside the volume is used as the key of the sparse arrays.

Figure 7:
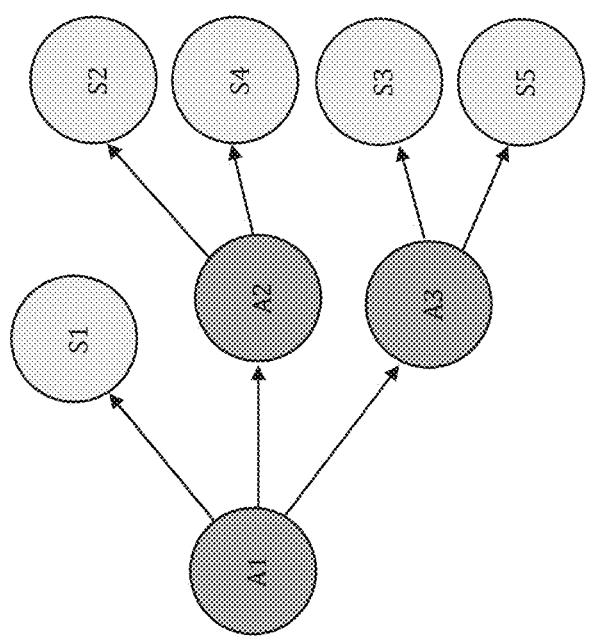

The snapshot hierarchy tree may be slightly modified in order for it to contain the required information. As discussed above, if internal nodes in the tree represent writable snapshots, there is no automatic way of knowing the order of writes and which writes should affect which child snapshots. In order to solve the above problem, it is possible to ensure that user generated snapshots are only leaves in the snapshot hierarchy tree. When a user generates a snapshot, the embodiments may implicitly create an anonymous internal read-only snapshot identical to the source, and have two user snapshots inherit from it—the original user volume/snapshot, and the newly created snapshot. FIG. 7 shows what the snapshot hierarchy tree from the above example may look like under this technique. Multiple snapshots may be taken at the same time from the same source in which case more than two user snapshots will inherit from a single node.

Furthermore, in some embodiments a split function may be favorable, where a snapshot hierarchy tree is split into two trees. This can be done by merging all relevant values for ancestors into the node which is to be split away from the original tree.

The snapshot hierarchy uses very little memory regardless of its representation since its size is of the same order of magnitude as the number of snapshots, which is much smaller than the number of addresses. Thus, the main question is how to represent and work with the mapping table.

In the following a memory volume is implemented as a sparse array which uses actual physical memory only for actual values it holds. The sparse array may provide the commands "add mapping", "remove mapping" and "get mapping" in constant time. Get mapping will return the value when present, or "empty" if there is no available value. Such a sparse array can for example be implemented using a standard TRIE tree. It is assumed that obtaining consecutive values in such a sparse array is cheaper than retrieving values which are far away from one another, and it is noted that this is true for standard TRIE trees.

There are two main alternatives for turning the mapping table into an array—by row (snapshot/volume id) and by column (address/offset). The index of the array may be a combination of address and snapshot id (volume id). If we have the snapshot id in the most significant bits of the index—it is as if we view the table by row. Otherwise it is by column.

Figure 8:
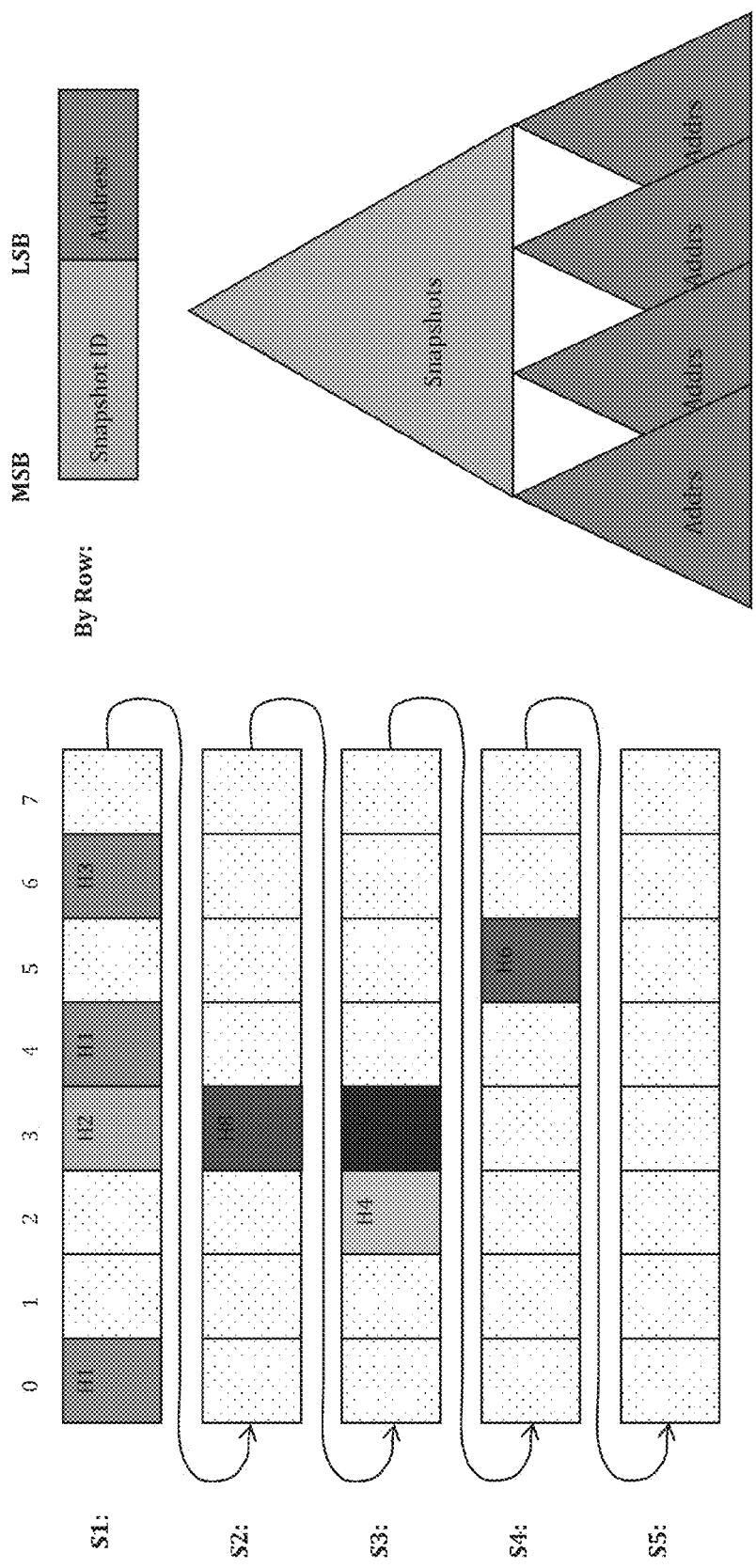
Figure 9:
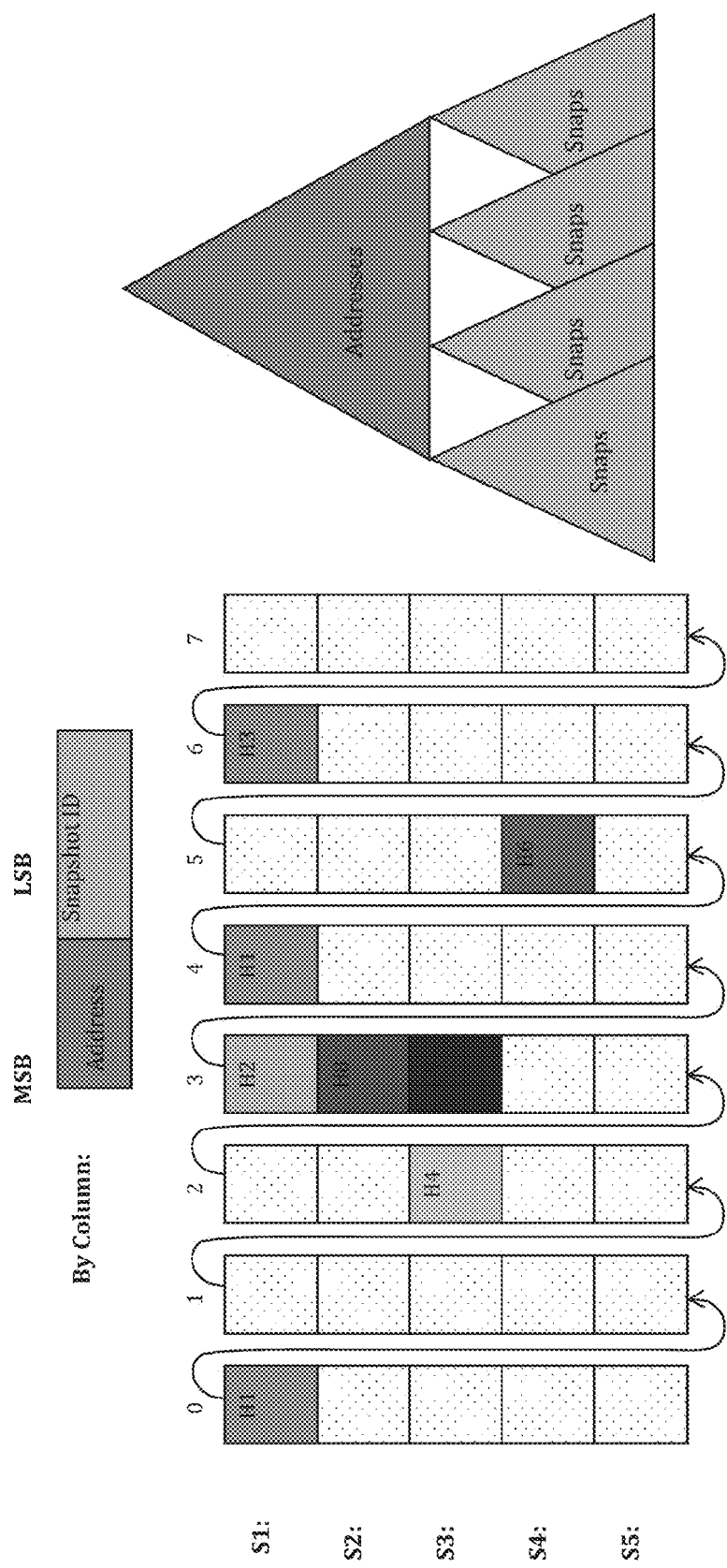

Reference is now made to FIG. 8, which is a simplified diagram that shows two ways side by side of visualizing the tree. It is convenient to visualize the sparse array as a tree. When working by row it is as if we have a tree of snapshots, where each leaf is in fact another tree of addresses in that snapshot. When working by column it is exactly the opposite. It is as if we have a tree of addresses, where each leaf contains a tree of snapshots which contain that address as can be seen in FIG. 9.

We refer to the first option, that is the row option, as a snapshot tree, not of course to be confused with the snapshot hierarchy tree described above, since there is a tree per snapshot. The second option, the column option, may be referred to as an address tree.

Performing write operations is convenient on both trees, since all one must do is add an entry to a well known index. Adding snapshots is also convenient on both trees, since the original assumption is that a sparse array is being dealt with. All the write operation entails is filling more indices.

Efficient deletion of snapshots is much more convenient on the snapshot tree, since one can easily traverse all the addresses dirtied by a specific snapshot and delete them.

Performing read operations on the snapshot tree is possible, although not optimal. We will now describe how they can be done, thus providing a full snapshot solution which is based solely on a snapshot tree and a snapshot hierarchy tree. In the following section we will describe an optimization which consists of keeping both a snapshot tree and a variant of an address tree.

To perform a read using the snapshot tree, one recursively obtains values from the snapshot tree, starting with the snapshot to be read from. One obtains the value at the location of the snapshot to be read from and the requested address. If a value exists it may simply be returned, otherwise we may recursively try the same procedure on the ancestor of this snapshot—as indicated by the snapshot hierarchy tree, until reaching the root of the snapshot hierarchy tree. While this read method works, it may be inefficient in cases of deep snapshot hierarchy trees, since the recursive procedure may take time in proportion to the depth of the tree.

Address Tree Optimization

Read operations can be performed more effectively on the address tree. In order to find the correct mapping one must traverse the snapshot hierarchy tree, which represents snapshot creation relations, and find the first ancestor which holds a mapping for the current address. Because all mappings of a certain address, across snapshots, are held together in the address tree, it is much more efficient in terms of tree traversal as well as CPU cache line accesses to perform read operations on this tree.

Thus, one may hold and maintain both trees, even though not optimal in terms of memory utilization. Of course, it would be extremely wasteful to keep double the amount of mapping values, that is hashes or internal physical locations, especially since all we need is information regarding the existence of a mapping. Only one of the trees must actually hold the mapping values, while the other will only indicate if a certain mapping exists or not. From the array point of view—such an existence tree can be seen as a bitmap, or as a set (in the set theoretic sense) of indices, and may still be implemented using a standard TRIE tree.

But which of the two trees should hold the actual mapping values? This brings us to the demotion requirement. Since it is favorable to have values of consecutive addresses written to the same snapshot or volume actually reside in the same block on disk, it would be more natural to have the snapshot tree hold the mapping values. To make sure only one read from disk is needed, one may make sure that only leaves of the snapshot tree containing the actual mapping values, are demoted. Under most scenarios this should account for the vast majority of metadata memory in use.

A further optimization may be not to hold zero values written to snapshots in the snapshot tree, and instead keep an indication of a zero value in the address existence tree. In this case the address existence tree will have three possible values—if an address exists and is not equal to zero, if it does not exist, and if it exists and is equal to zero. It should be noted that there is no need to hold zero values written to non-snapshot values because they have no ancestor.

An embodiment of the above two-tree solution is illustrated in FIG. 10 and may proceed along the lines of the previously defined embodiment. A modified snapshot hierarchy tree 1000 is held such that each internal node comprises an anonymous read-only snapshot, and each leaf comprises a user generated snapshot/volume. The tree may be held in a compact manner to make sure it permanently resides in the CPU's cache. A possible implementation can be an array of indices, where each slot in the array represents a snapshot, and holds the id of its father snapshot in the hierarchy tree. Unused slots may form a "free list". A less efficient representation with two way pointers between father and children may also be used for write and snapshot delete operations. To translate external volume IDs in use by the user, to the internal snapshot id representation, one may hold a simple id translation table which can be implemented as an array or hash table.

Additionally, an address existence tree 1002 is held, which may reside in memory (RAM), and a snapshot "value tree" which has the option of demoting "value leaves".

More Read Optimizations

Auxiliary Data Structure—Aggregated Snapshot Tree

In cases of a very deep snapshot hierarchy tree, some read operations may need to perform tens of thousands of cache memory reads in order to understand which snapshot up the hierarchy tree actually contains a mapping for this address. This may exceed the allotted time for the read operation in some scenarios. To overcome this issue, an aggregation optimization can be implemented. The aggregation may recognize long strands in the snapshot hierarchy tree, and create an auxiliary aggregated snapshot tree in which each snapshot is actually a group of snapshots contained in such a strand. The value per address will be "exists" if at least one of the snapshots in the strand contains a mapping for this address, and "doesn't exist" otherwise. The recommended size of strands on which to perform this optimization may be approximately the square root of the deepest possible snapshot hierarchy tree, which will reduce the number of cache memory reads in the worst case from the depth of the tree to 2 times the square root of the depth.

Auxiliary Data Structure—SnapOrder

Referring to FIG. 13, which is discussed further hereinbelow, in some cases, the number of snapshots writing to each address is much smaller than the depth of the snapshot hierarchy tree. In such cases it would be favorable to perform read operations by going over the list of snapshots which actually wrote something to a specific address instead of by going over all snapshots up the snapshot hierarchy tree. In effect, instead of traversing the tree and looking for the first snapshot which contains a value for the requested address, one may go over all snapshots which contain a value for a specific address and look for the one which is the closest ancestor of the origin snapshot.

To do this, one may maintain an auxiliary data structure which returns Depth-First Search ordering of the snapshot hierarchy tree leaves, that is of user created snapshots and volumes, and can be implemented using an array. One may use the following main properties of such an ordering:

1. The leaves of each snapshot are ordered in a consecutive way;
2. If snapshot A is an ancestor of a snapshot B then the range of leaves of A completely overlaps that of B. The reverse is also true.

From an operational perspective the data structure holds for every snapshot S in the hierarchy tree its MinLeaf and MaxLeaf, and provides the following functionality:

MinLeaf(S): returns the order of a leaf of S with the minimum order.

MaxLeaf(S): returns the order of a leaf of S with the maximum order.

IsAncestor(A, B): equivalent to MinLeaf(A)<=MinLeaf(B) and MaxLeaf(A)>=MaxLeaf(B)

LeafCount(S): equivalent to MaxLeaf(S)−MinLeaf(S)+1

It is worth noticing that for a leaf L (user snapshot/volume), MinLeaf(L)=MaxLeaf(L)=DFS_Order(L).

A read operation using this SnapOrder structure may receive a list of snapshots S' which have a value at a specific address, and will find the closest ancestor of the requested snapshot S by traversing the snapshots S' and returning the one which is an ancestor of S using IsAncestor(S', S) and has the minimum LeafCount(S'). Such a search is linear in the number of snapshots that have written to the specified address.

Read

Reference is now made to FIG. 11, which is a simplified flow chart showing a naïve read procedure according to the present embodiments without using optimizations.

A read operation may receive as input a snapshot id S and an address (or range of consecutive addresses) A.

It may then traverse the snapshot hierarchy tree, starting from the requested snapshot and going up, and check if a block was written to the current snapshot at the specified address. If so this value is to be returned, if the root volume is reached and a value is not found a result of "empty" is returned.

FIGS. 12 and 13 illustrate ways of making the process more efficient using two of the read optimizations described above. FIG. 12 illustrates the read operation of FIG. 11 which is modified to be carried out with an address existence tree. FIG. 13 illustrates a read operation which is modified to be carried out using the snap order structure.

According to FIG. 12, the read operation may begin by requesting the address from the address existence tree and receiving the appropriate "column". Next it may find which snapshot among those which wrote to this address is the closest ancestor of S. The straightforward solution would be to loop over the snapshot hierarchy tree and cross reference it with the column of existence bits, looking for the first snapshot up the tree which contains a mapping for this address.

Once such a snapshot is found, a request may be made to the snapshot value tree to retrieve the value of the mapping present in the address requested under the snapshot just found. If none is found a result of "empty" is returned. Such a query may induce a page read from disk if the mapping value resides in a destaged leaf of the tree.

The relevant value may be returned as output, and an actual data read operation may then be performed according to the outputted value.

In a case in which a range of consecutive addresses is requested, and assuming the values were previously written to these addresses under the same snapshot, either at the same time or separately, the above described read operation may not require more than one metadata block read from disk. The single metadata block read depends on the assumption that the range was aligned and sized in a manner that all its values fit in a single block on disk.

Write

Reference is now made to FIG. 14, which is a simplified flow chart illustrating a write procedure for use with the present embodiments. A write operation may receive as input a snapshot id S and an address, or range of consecutive addresses A, as well as a mapping value or a group of values.

An actual data write operation to a physical location may then be performed.

It will perform an update request to the snapshot value tree indicating the new values, and another request to the address existence tree—indicating the existence of these new mappings.

In some cases, if for example the values held in these mappings represent hash digests, or in other cases where logical overwrites are not directed to the same physical location, it may be beneficial for the snapshot value tree to return the old values which were overrun by this operation, if such values exist.

At this point, one of two things may cause us to change values in other snapshots:

If the present write does not overwrite a previous one, there exists a chance that it causes an entry in an ancestor snapshot to become overshadowed. This means no one will ever read that entry anymore, and thus it can be removed.

If the value of this entry is identical to that of its siblings, then it may be possible to move the mapping up the snapshot hierarchy tree to their mutual ancestor, and remove it from all children. This is an optimization which is not required to meet the original goal of utilizing memory in proportion to the number of addresses occupied by user writes.

In order to search for such an overshadowed entry one may perform a read operation and obtain the closest ancestor which contains a value in the present address, if such an ancestor exists. Now, in order to find out whether the ancestor was overshadowed by the new write we need to check that all paths from the ancestor snapshot to its leaves contain a value for the specified address. This can be done using the same techniques used to read values—either by traversing the snapshot hierarchy tree, or by using the SnapOrder structure.

Note that the SnapOrder structure can be used linearly in terms of the number of snapshots that write to the specified address. One must simply make sure that the intervals spanned by MinLeaf( ) and MaxLeaf( ) for all the descendants of the ancestor snapshot that write to the specified address cover all the leaves of this ancestor snapshot.

Create Snapshot

Reference is now made to FIG. 15, which is a simplified flowchart illustrating a procedure for creating a snapshot according to the present embodiments. Snapshot creation may simply update the snapshot hierarchy tree. Two new and typically empty nodes may be added as leaves of the source volume. The first may represent the original volume, and the second may represent the newly taken snapshot. Both may contain an identical mappings state, that of their anonymous read-only ancestor, until user writes cause them to diverge. In cases of writable snapshots, it may make sense to take several snapshots instantaneously. In such cases, if N snapshots are taken, N+1 new nodes may analogously be added as leaves of the source volume.

The snapshot tree and address tree are sparse arrays and thus do not need to be updated upon snapshot creation.

Any auxiliary structures such as SnapOrder also may need updating.

Delete Snapshot

Reference is now made to FIG. 16, which is a simplified diagram illustrating a procedure for deletion of a snapshot according to an embodiment of the present invention. Snapshot deletion may begin by removing the snapshot to delete from the snapshot hierarchy tree.

Snapshot delete may then request the snapshot to be deleted from the snapshot value tree, and traverse its "row".

For each mapping, a remove existence request must be performed upon the address existence tree. Additionally, actual data removal may need to be performed.

The entire row may then be removed from the snapshot hash value tree.

Deletion of a snapshot may cause an anonymous snapshot to remain with only a single child. The anonymous snapshot may then be merged with its child in the following manner: move all the dirtied entries of the child snapshot to its ancestor, or vice versa, if the ancestor contains fewer entries, and remove the redundant snapshot. In case both ancestor and child have an entry for the same address, the child's value should be retained.

As with the create operation, auxiliary structures such as SnapOrder may also need to be recalculated at this time.

Data Replication

An example of use of the present embodiments is in data replication for disaster recovery. All of the data in the volume is copied to a distant location. Synchronous replication of the data however increases latency for user requests. An asynchronous replication method for copying the data may be based on taking periodic snapshots of the volume. Using the present embodiments one simply catalogues and sends the changes. Further updates can be made whenever desired by taking a snapshot of the previous snapshot and finding the new differences. Prior art systems use creation and deletion of snapshots based on the full virtual address range, or close to it, and achieve RPOs of above ten minutes. The demand, however is for RPOs in the seconds range, which embodiments of the present invention can achieve.

General

It is noted that there is no significant performance degradation when working with snapshots as opposed to working with regular volumes. The present snapshot method works well with high performance I/O storage systems.

It is expected that during the life of a patent maturing from this application many relevant technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

The attention of the skilled reader is directed to all combinations and permutations of the features described herein. It is explicitly stated that certain features of the invention, which are, for clarity, described in the context of separate embodiments, may also be provided in combination in a single embodiment or in different combinations of the separate embodiments. Such combinations are explicitly to be considered on the basis of the present text. Conversely, various features of the invention, which are, for brevity, described in the context of a single embodiment, may also be provided separately or in any suitable subcombination or as suitable in any other described embodiment of the invention. Again, these combinations are drawn to the attention of the skilled reader as if explicitly taught herein.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A memory management method comprising taking a given snapshot of a memory volume at a given time, providing the snapshot with a mapping table and memory values of the volume, the mapping table and memory values comprising entries for addresses of the physical memory containing data, and wherein said values differ from data in an ancestor, wherein the given snapshot is enabled to be a part of a hierarchy of snapshots;

wherein said given snapshot is part of a hierarchy of snapshots taken at succeeding times, the method comprising providing said entries to said given snapshot for addresses of the physical memory to which data was entered subsequent to taking of a most recent previous snapshot in the hierarchy, and providing, to said given snapshot, pointers to previous snapshots in the hierarchy for data entered prior to taking of a most recent previous snapshot;

navigating the hierarchy of snapshots using a first tree, a second tree, and a third tree; wherein the first tree indicates a most recent ancestor snapshot of said given snapshot, wherein the second tree indicates which level of the hierarchy of snapshots contains data, wherein the third tree is enabled to provide a depth-first search ordering of snapshots within the hierarchy of snapshots; and recognizing a long strand in the hierarchy of snapshots, aggregating the long strand in the hierarchy of snapshots to create an aggregated snapshot tree, wherein each snapshot is enabled to be a group of snapshots.

2. The method of claim 1, wherein said memory volume is a thinly provisioned memory volume in which a relatively larger virtual address range of virtual address blocks is mapped to a relatively smaller physical memory comprising physical memory blocks via a mapping table containing entries only for addresses of the physical memory blocks containing data.

3. The memory management method of claim 1, comprising creating a read-only version of said thinly provisioned memory volume to provide a fixed base for said hierarchy.

4. The memory management method of claim 3, comprising providing a first tree structure of said hierarchy to indicate for each written memory block a most recent ancestor snapshot of a queried snapshot containing a respective entry.

5. The memory management method of claim 4, comprising providing a read function which traverses said first tree structure to read a value of a given block, and a write function which writes a block value to a most recent snapshot in said hierarchy.

6. The memory method of claim 4, comprising providing a second tree structure, said second tree structure indicating, for each written memory block, which level of said hierarchy contains a value for said block.

7. The memory management method of claim 6, comprising providing a read function to traverse said second memory structure to find a level of said hierarchy containing a value for a requested block and then to use said first memory structure to determine whether said level containing said value is an ancestor in said hierarchy of a level from which said block was requested.

8. The memory management method of claim 4, comprising providing a delete function for deleting snapshots, wherein for a snapshot to be deleted which has a single sibling, values of sibling and parent nodes merged into a single node.

9. The memory management method of claim 1, wherein said physical memory comprises random access memory disks.

10. The memory management method of claim 1, wherein said blocks are of a granularity of one member of the group consisting of less than 100k, less than 10k and 4k.

11. The memory management method of claim 1, comprising aligning mapping metadata of a respective snapshot to a page of memory.

12. The memory management method of claim 6, comprising providing a third tree structure, said third tree structure returning a Depth-First Search ordering of respective snapshots of said hierarchy, such that leaves of each snapshot are ordered consecutively and that if a snapshot A is an ancestor of a snapshot B then the ordering of leaves of A completely overlaps that of B.

13. The memory management method of claim 12, comprising providing a read function, said read function configured to use said third tree structure to obtain a list of snapshots having a value at a requested memory address, and to find a closest ancestor in said list of a requesting snapshot by traversing the snapshots of said list and returning a respective snapshot of said list which is an ancestor of the requesting snapshot and has a minimum number of leaves.

14. The memory management method of claim 1, wherein said snapshot provision unit is configured to provide an indirection layer or a look-aside table to provide data deduplication.

15. A system comprising
a data storage system including a storage array;
a memory volume on the storage array; and
computer-executable program logic encoded in memory of one or more computers in communication with the data storage system to enable management of a snapshot provision unit, wherein the computer-executable program logic is configured for the execution of:
taking a given snapshot of the memory volume at a given time using the snapshot provision unit, the snapshot comprising a mapping table and memory values of the volume, the mapping table and memory values comprising entries for addresses of the physical memory containing data, which values entered differ from an ancestor of said snapshot;
wherein the given snapshot is enabled to be a part of a hierarchy of snapshots;
wherein said given snapshot is part of a hierarchy of snapshots taken at succeeding times, and wherein said snapshot provision unit is configured to provide said entries to said given snapshot for addresses of the physical memory to which data was entered subsequent to taking of a most recent previous snapshot in the hierarchy, and to provide to said given snapshot pointers to previous snapshots in the hierarchy for data entered prior to taking of a most recent previous snapshot;
wherein the provision unit navigates the hierarchy of snapshots using a first tree, a second tree, and a third tree; wherein the first tree indicates a most recent ancestor snapshot of said given snapshot, wherein the second tree indicates which level of the hierarchy of snapshots contains data, wherein the third tree is enabled to provide a depth-first search ordering of snapshots within the hierarchy of snapshots; and
wherein the provision unit is enabled to recognize a long strand in the hierarchy of snapshots and the provision unit is enabled to aggregate the long strand in the hierarchy of snapshots to create an aggregated snapshot tree, wherein each snapshot is enabled to be a group of snapshots.

16. The system of claim 15, wherein said memory volume is a thinly provisioned memory volume in which a relatively larger virtual address range of virtual address blocks is mapped to a relatively smaller physical memory comprising physical memory blocks via a mapping table containing entries only for addresses of the physical memory blocks containing data.

17. The system of claim 15, wherein the computer-executable program logic is further configured for the execution of creating a read-only version of thinly provisioned memory volume to provide a fixed base for said hierarchy.

18. The system of claim 17, wherein the computer-executable program logic is further configured for the execution of providing a first tree structure of said hierarchy to indicate for each written memory block a most recent ancestor snapshot of a queried snapshot containing a respective entry.

19. The system of claim 18, wherein said snapshot provision unit comprises a read function which traverses said first tree structure to read a value of a given block, and a write function which writes a block value to a most recent snapshot in said hierarchy.

20. The system of claim 18, wherein the computer-executable program logic is further configured for the execution of providing a second tree structure, said second tree structure indicating, for each written memory block, which level of said hierarchy contains a value for said block.

21. The system of claim 20, wherein said snapshot provision unit comprises a read function configured to traverse said second memory structure to find a level of said hierarchy containing a value for a requested block and then to use said first memory structure to determine whether said level containing said value is an ancestor in said hierarchy of a level from which said block was requested.

22. The system of claim 18, wherein said snapshot provision unit further comprises a delete function for deleting snapshots, wherein for a snapshot to be deleted which has a single sibling, values of sibling and parent nodes are merged into a single node.

23. The system of claim 15, wherein said physical memory comprises random access memory disks.

24. The system of claim 15, wherein said blocks are of a granularity of one member of the group consisting of less than 100k, less than 10k and 4k.

25. The system of claim 15, wherein the computer-executable program logic is further configured for the execution of aligning mapping data of a respective snapshot to a page of memory.

26. The system of claim 20, wherein the computer-executable program logic is further configured for the execution of providing a third tree structure, said third tree structure returning a Depth-First Search ordering of respective snapshots of said hierarchy, such that leaves of each snapshot are ordered consecutively and that if a snapshot A is an ancestor of a snapshot B then the ordering of leaves of A completely overlaps that of B.

27. The system of claim 26, wherein said snapshot provisioning unit comprises a read function, said read function configured to use said third tree structure to obtain a list of snapshots having a value at a requested memory address, and to find a closest ancestor in said list of a requesting snapshot by traversing the snapshots of said list and returning a respective snapshot of said list which is an ancestor of the requesting snapshot and has a minimum number of leaves.

28. The memory management system of claim 15, wherein the computer-executable program logic is further configured for the execution of providing an indirection layer or a look-aside table to provide data deduplication.

* * * * *